US012584515B2

(12) United States Patent
Merritt et al.

(10) Patent No.: US 12,584,515 B2
(45) Date of Patent: Mar. 24, 2026

(54) THERMALLY ADAPTIVE GAS BEARING SLEEVE CONFIGURED FOR REMOTE GEOMETRY CONTROL

(71) Applicant: Hamilton Sundstrand Corporation, Charlotte, NC (US)

(72) Inventors: Brent J. Merritt, Southwick, MA (US); Viktor Kilchyk, Lancaster, NY (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 1 day.

(21) Appl. No.: 18/590,261

(22) Filed: Feb. 28, 2024

(65) Prior Publication Data

US 2025/0271025 A1 Aug. 28, 2025

(51) Int. Cl.
*F16C 17/02* (2006.01)

(52) U.S. Cl.
CPC ........ *F16C 17/024* (2013.01); *F16C 2326/43* (2013.01)

(58) Field of Classification Search
CPC ........... F16C 17/024; F16C 33/12–125; F16C 2326/43
See application file for complete search history.

(56) References Cited

U.S. PATENT DOCUMENTS

| | | | |
|---|---|---|---|
| 8,656,714 B2 | 2/2014 | Pinto, IV et al. | |
| 9,777,715 B2 | 10/2017 | Laifenfeld et al. | |
| 10,656,048 B2 | 5/2020 | Calkins et al. | |
| 2009/0274401 A1* | 11/2009 | Adams | F16C 17/042 384/103 |
| 2014/0270603 A1* | 9/2014 | Rosen | F16C 33/74 384/114 |
| 2015/0292552 A1* | 10/2015 | Thompson | F16C 17/024 384/103 |
| 2019/0170190 A1* | 6/2019 | Ryu | F16C 27/06 |
| 2022/0290716 A1* | 9/2022 | Wiedmann | F16C 17/024 |
| 2025/0163957 A1 | 5/2025 | Futae et al. | |

FOREIGN PATENT DOCUMENTS

| | | |
|---|---|---|
| EP | 2949952 A1 | 12/2015 |
| JP | 2002295467 A | 10/2002 |
| WO | 2022181509 A1 | 9/2022 |

OTHER PUBLICATIONS

Extended European Search Report for EP Application No. 25159767.0, dated Jul. 29, 2025, pp. 1-7.

(Continued)

*Primary Examiner* — Alan B Waits
(74) *Attorney, Agent, or Firm* — CANTOR COLBURN LLP

(57) ABSTRACT

A component of a gas foil bearing, having: a plurality of materials forming a composition gradient that defines a first coefficient of thermal expansion (CTE) and a second CTE that differs from the first CTE, wherein: the plurality of materials include one or more of different metals, plastics, or fibers; and the plurality of materials is formed with fluid or gas filled voids, so that when the component is subject to selected heating, the fluid or gas filled voids increase in temperature and the component changes from a first shape to a second shape.

16 Claims, 13 Drawing Sheets

(56) References Cited

OTHER PUBLICATIONS

Hao et al., "A Review of Smart Materials for the Boost of Soft
Actuators, Soft Sensors, and Robotics Applications", Chinese Jour-
nal of Mechanical Engineering, 2022, pp. 1-16.
Micalizzi et al., Shape-memory actuators manufactured by dual
extrusion multimaterial 3d printing of conductive and non-
conductive filaments; 2019 Smart Mater. Struct. 28 105025; pp.
1-13.

* cited by examiner (T1)

(T2>T1)

(T2>T1)

(T1)

(T2>T1)

(T1)

(T2>T1)

(T1)

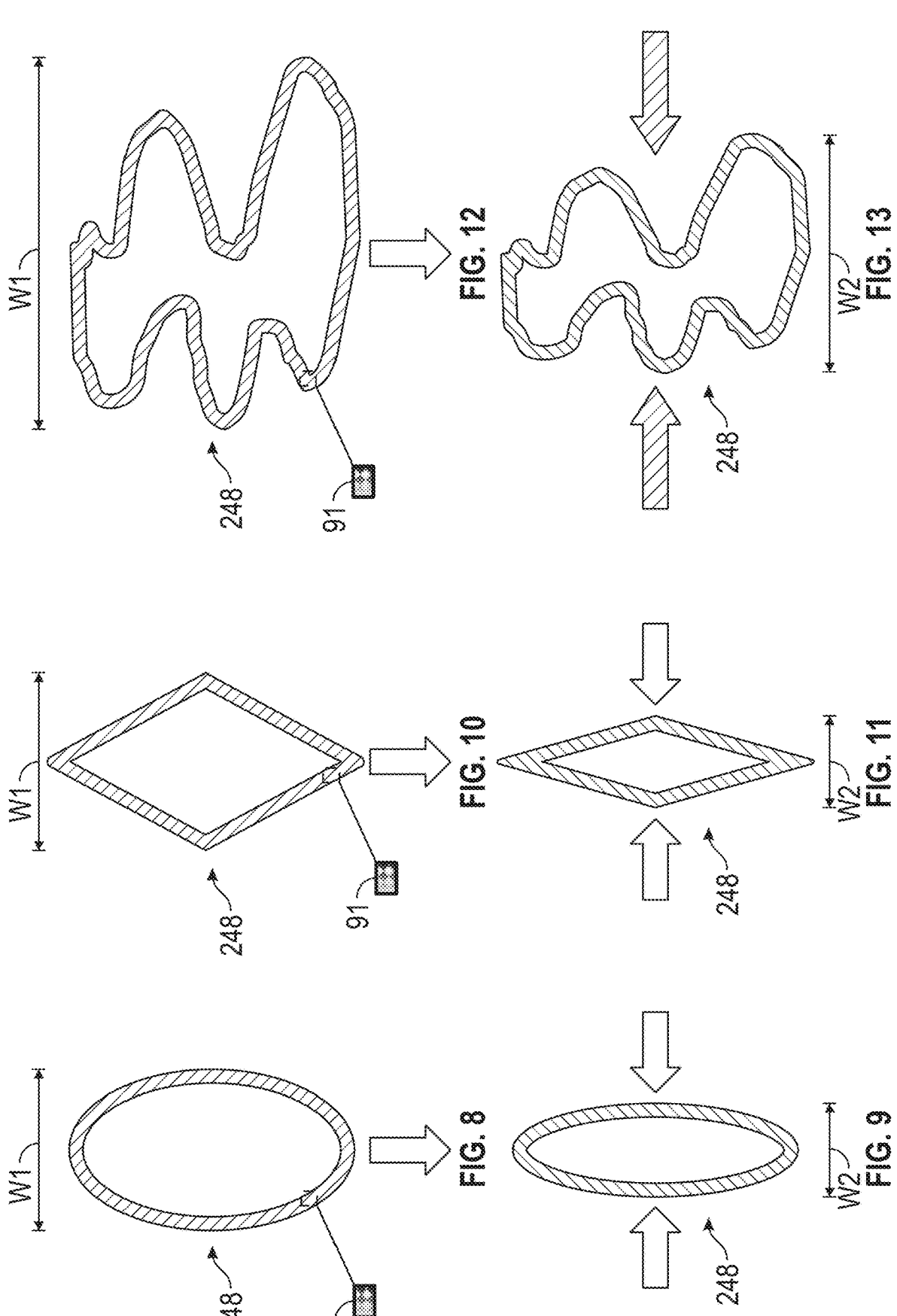

T2 > T1

T1

T2 > T1

THERMALLY ADAPTIVE GAS BEARING SLEEVE CONFIGURED FOR REMOTE GEOMETRY CONTROL

BACKGROUND

The embodiments are directed to gas bearings and more specifically to a thermally adaptive gas bearing sleeve configured for remote geometry control.

Thermal stability may impact the effectiveness of a of gas foil bearing (GFB) that supports a lubricated rotating shaft. A GFB may operate continuously at high ambient temperatures. During normal operation, i.e., under nominal loads, an air film between the GFB and the shaft allows for both hydrodynamic pressure generation and heat flow in the bearing. The heat flow provides the desired level of temperature homogenization within the bearing body. A maximum value of a temperature gradient in the GFB is typically found in the region of a mechanical load transfer, due to the raised shear forces in the bearing lubricant. If the bearing is overloaded, or during low rotational speed, the bearing clearance with the shaft may become thin which may result in a raised temperature gradient. The excessive gradients may lead to an uneven thermal expansion of the bearing structural components. Such thermally induced deformation and warping of the GFB geometry also result in thermal stability loss, i.e., a blocking of internal bearing channels for lubricant flow, or the shaft becoming stuck in the GFB outer shaft or bushing.

BRIEF DESCRIPTION

Disclosed is a component of a gas foil bearing, including: a plurality of materials forming a composition gradient that defines a first coefficient of thermal expansion (CTE) and a second CTE that differs from the first CTE, wherein: the plurality of materials include one or more of different metals, plastics, or fibers; and the plurality of materials is formed with fluid or gas filled voids, so that when the component is subject to selected heating, the fluid or gas filled voids increase in temperature and the component changes from a first shape to a second shape.

In addition to one or more aspects of the component or as an alternate the component is a bearing sleeve.

In addition to one or more aspects of the component or as an alternate the first shape is a curved triangulated shape, and the second shape is circular.

In addition to one or more aspects of the component or as an alternate, the component includes: a structural element that defines an outer boundary and extends in a first direction between first and second ends to define a length of the element and in a second direction to define a width of the element, wherein: a first layer extends in the first direction between the first and second ends and has a first CTE; and a second layer extends in the first direction between the first and second ends and has the second CTE that differs from the first CTE, wherein a layer junction is defined between the first and second layers, wherein the element is configured to define a first element shape when the element is a first temperature and a second element shape when the element is at a second temperature that is greater than the first temperature.

In addition to one or more aspects of the component or as an alternate, the component includes one or more of: first fibers in the first layer that have the first CTE; and second fibers in the second layer that have the second CTE.

In addition to one or more aspects of the component or as an alternate the first shape is linear, and the second shape is arcuate.

In addition to one or more aspects of the component or as an alternate: one or both of the first and second layers are formed of first and second materials, one or both of which is a bistable metal, alloy or composite.

In addition to one or more aspects of the component or as an alternate, the component includes: a base formed by the composition gradient defining the first CTE and the second CTE that differs from the first CTE, wherein: the base defines an outer boundary and beads within the outer boundary; and each of the beads has a bead void, and each of the beads includes: first and second perimeter segments that are opposite each other and formed to define the first CTE; and third and fourth perimeter segments that are opposite each other, adjacent to the first and second perimeter segments, and formed to define the second CTE.

In addition to one or more aspects of the component or as an alternate: each perimeter segment has a radial inner surface and a radial outer surface; the radial inner surface of the first and second perimeter segments is formed to define the first CTE and the radial outer surface of the first and second perimeter segments is formed to define the second CTE; and the radial inner surface of the third and fourth perimeter segments is formed to define the second CTE and the radial outer surface of the third and fourth perimeter segments is formed to define of the first CTE.

In addition to one or more aspects of the component or as an alternate adjacent ones of the beads are interconnected to form a lattice.

In addition to one or more aspects of the component or as an alternate: the outer boundary defines a first outer end and a second outer end, wherein the first and second outer ends are opposite each other, and the base includes a top elastomer layer that is disposed against the first outer end of the outer boundary and a bottom elastomer layer that is disposed against the second outer end of the outer boundary.

In addition to one or more aspects of the component or as an alternate the base includes a support material that forms a support structure that defines the outer boundary of the base and a plurality of base voids, wherein each of the plurality of base voids is lined with one of the beads.

In addition to one or more aspects of the component or as an alternate the support material is different from the beads.

In addition to one or more aspects of the component or as an alternate the beads are oval shaped.

In addition to one or more aspects of the component or as an alternate the beads are diamond shaped.

In addition to one or more aspects of the component or as an alternate the composition gradient is formed of a first material having the first CTE and a second material having the second CTE.

BRIEF DESCRIPTION OF THE DRAWINGS

The following descriptions should not be considered limiting in any way. With reference to the accompanying drawings, like elements are numbered alike:

FIG. 8 shows the element formed as an oval shaped loop, having a composition gradient of a plurality of materials (only one material is shown) having different coefficients of thermal expansion (CTE), where the layers include fluid or gas filled voids that can be selectively heated via induction;

FIG. 9 shows the loop of FIG. 8, which has been selectively heated;

FIG. 10 shows the element formed as a diamond shaped loop, having a composition gradient of a plurality of materials (only one material is shown) having different coefficients of thermal expansion (CTE), where the layers include fluid or gas filled voids that can be selectively heated via induction;

FIG. 11 shows the bead of FIG. 10, which has been selectively heated;

FIG. 12 shows the element formed as a random shaped loop, having a composition gradient of a plurality of materials (only one material is shown) having different coefficients of thermal expansion (CTE), where the layers include fluid or gas filled voids that can be selectively heated via induction;

FIG. 13 shows the bead of FIG. 12, which has been selectively heated;

DETAILED DESCRIPTION

Figure 1A:
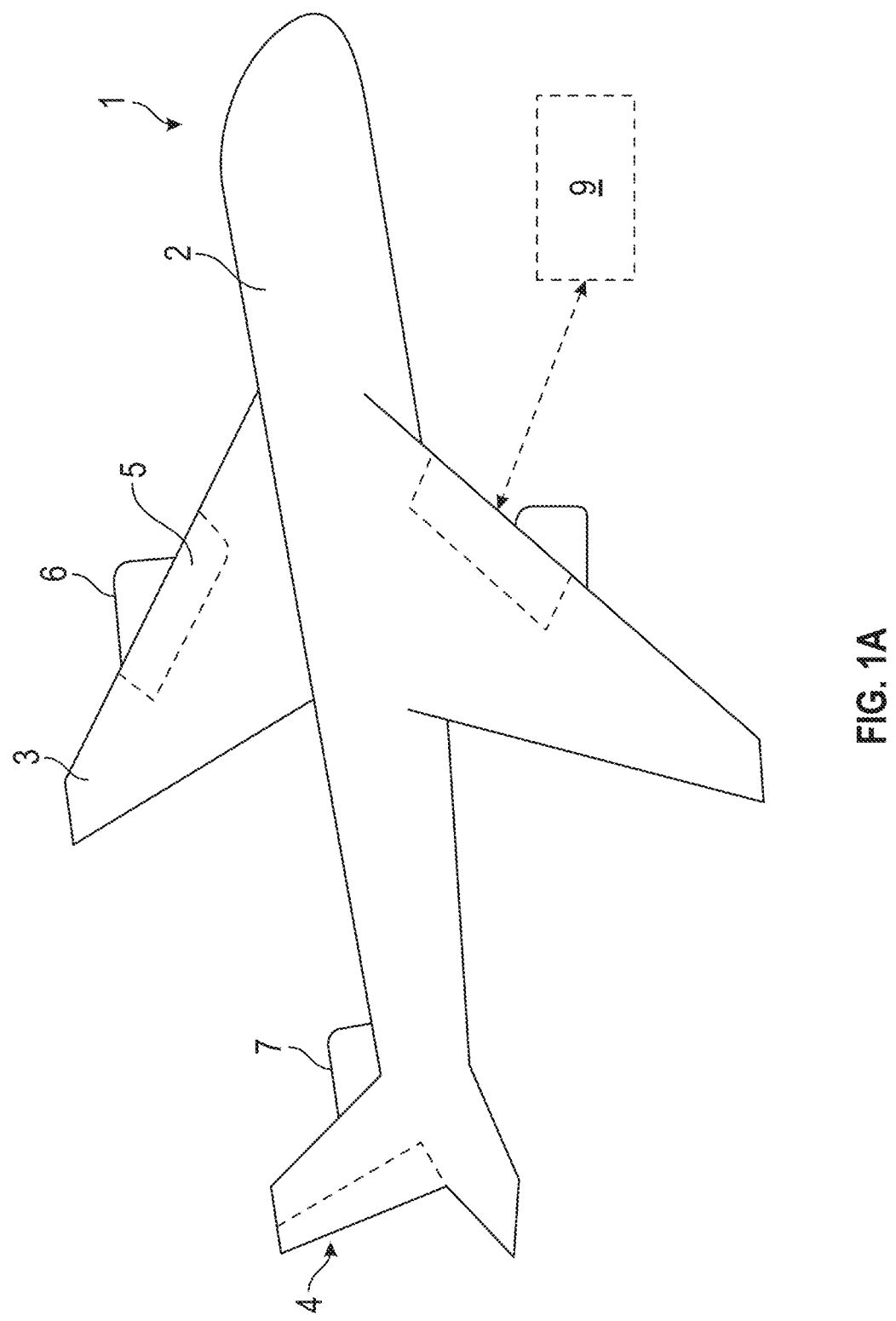
FIG. 1A shows an aircraft according to an embodiment.

A detailed description of one or more embodiments of the disclosed apparatus and method are presented herein by way of exemplification and not limitation with reference to the Figures.

FIG. 1 shows an aircraft 1 having a fuselage 2 with a wing 3 and tail assembly 4, which may have control surfaces 5. The wing 3 may include an engine 6, such as a gas turbine engine, and an auxiliary power unit 7 may be disposed at the tail assembly 4. The aircraft 1 may have an air cycle machine 9.

Figures 1B, 1C, 1D:
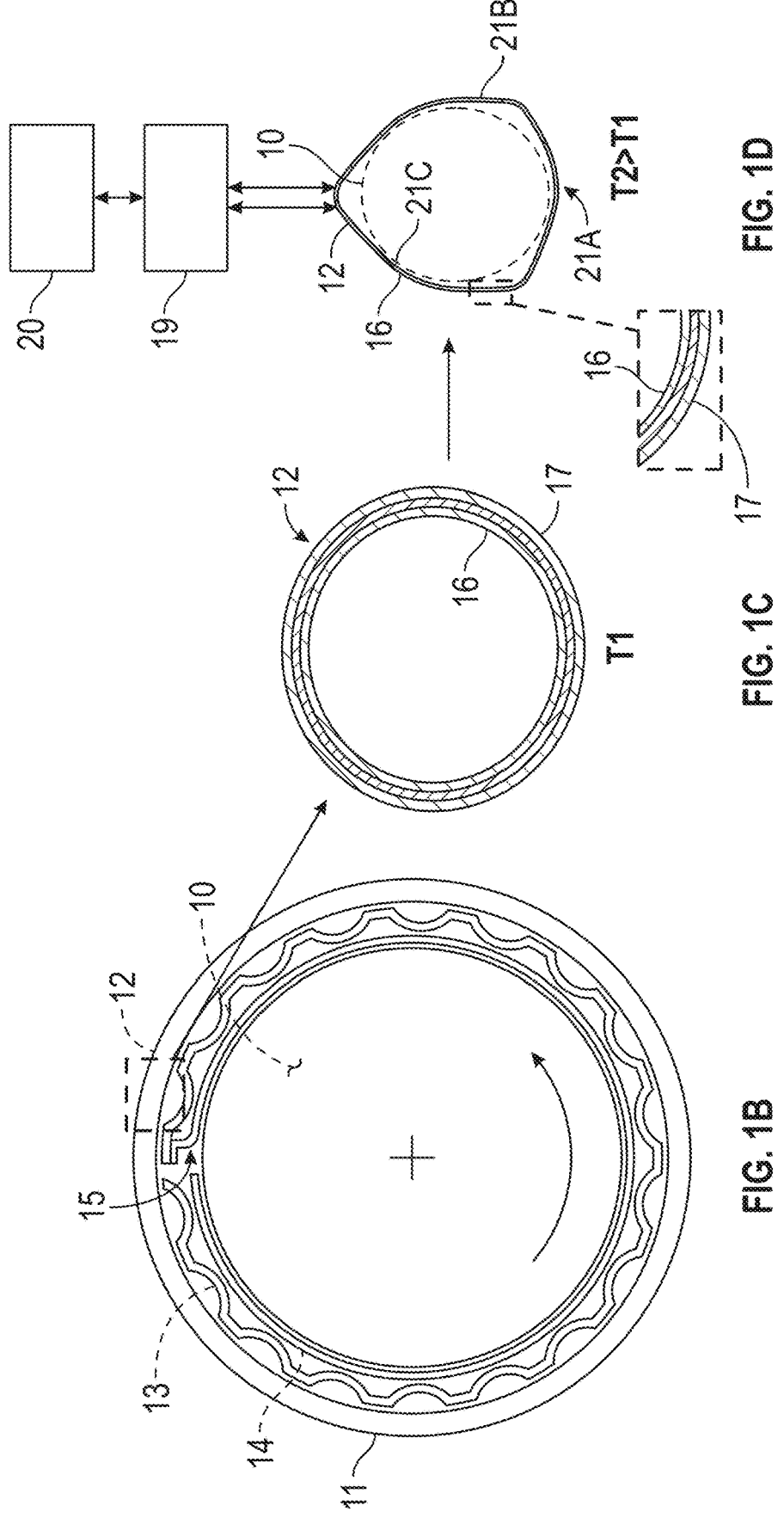
FIG. 1B shows a gas foil bearing (GFB) according to an embodiment.
FIG. 1C shows a schematic illustration of an outer sleeve of the GFB formed of a plurality of materials with different coefficients of thermal expansion (CTE) according to an embodiment, at a first temperature T1 to provide a first shape.
FIG. 1D shows another schematic illustration of the outer sleeve, at a second temperature T2 to provide a second shape.
Figure 1E:
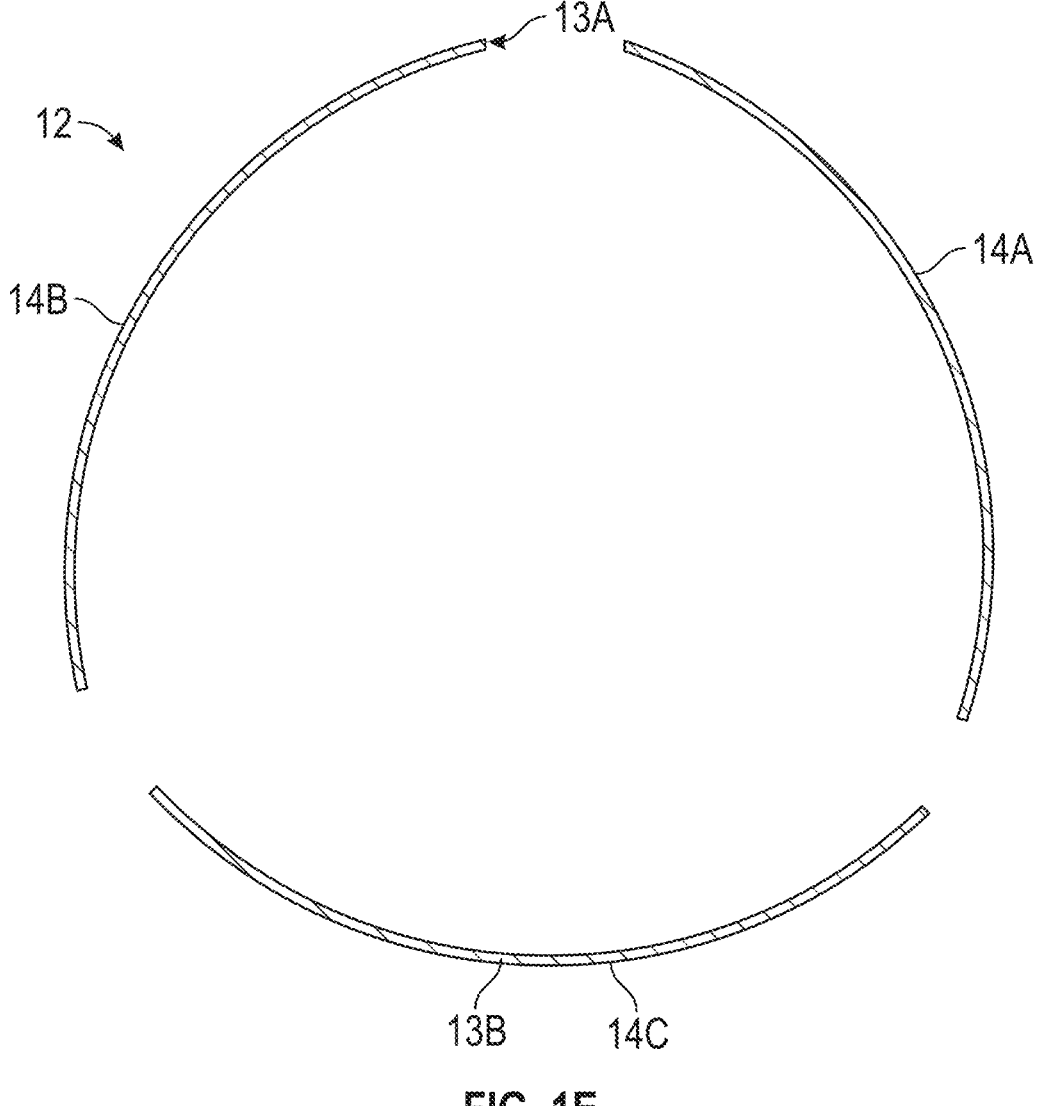
FIG. 1E shows additional aspects of the outer sleeve that provide for the desired circular to triangulated shape change when heated.

Turning to FIG. 1B, rotating parts such as a journal shaft (or shaft) 100 may rotate within a gas foil bearing (GFB) 11. The GFB 11 includes components including a bearing sleeve 12 or sleeve, or bushing, that may be cylindrical. The bearing sleeve 12 may surround a bump foil 13, which may be ring shaped with an undulating profile. The bump foil 13 may surround a top foil 14, which also may be ring shaped and have a cylindrical profile. A predetermined gap 15 may be defined between the top foil 14 and the shaft 10, which may be separated by a layer of air film during rotation of the shaft 10.

As shown in FIG. 1C, the bearing sleeve may be additive manufactured with a first material 16 and a second material 17. The second material 17 is included to induce a variable stiffness in the sleeve 12, and may be, e.g., 10 microns thick. For example, the secondary material 17 may have a different coefficient of thermal expansion (CTE) from the first material 16 to enable a predetermined deformation when selectively irradiated via induction heating, as discussed in greater detail below.

For example, FIG. 1C schematically shows the bearing sleeve 12 at a first temperature T1 to provide a first shape. FIG. 1D shows the bearing sleeve 12 in a at a second temperature T2>T1 to provide a second shape upon via radiated with induction radiation by an induction heater 19. The heater 19 may be controlled by a controller 20 that is programmed to heat the GFB 11 depending on operational speed of the shaft 10, the ambient temperature or other condition which would warrant a selective deformation of the sleeve 12 to increase the operational efficiency of the GFB 11 and/or the shaft 10. That is, the heater 19 may be remotely controlled and therefore the shape of the bearing sleeve 12 may be remotely controlled.

That is, when selectively heated to the second shape, such as when the engine in a relatively cold state, the sleeve 12 may form a curved triangulated shape and there will at least three points of contact 21A-21C between the GFB 11 and the internal shaft 10. Otherwise, the bearing sleeve 12 may have a circular cross section as provided with the first shape. Benefits of a bearing sleeve 12 that deforms as shown include a reduction of non-uniform or undesired deformation that may otherwise occur with temperature gradients that are induced throughout the operation of the GFB 11. That is, the embodiments provide a GFB 11 that may have an optimized stiffness over substantially an entire range of operation of the GFB 11. The GFB 11 that deforms as shown from selective induction heating may increase the bearing capacity, reduce startup draft, increase durability, provide improved modal stability, and provide an increased capacity.

It is to be appreciated that the sleeve 12 may be configured to change from the shape shown in FIG. 1D to the shape shown in FIG. 1C when selectively heated by an induction heater, i.e., the reverse of the shape change discussed above. The shape change direction, and the resulting shapes, may be configured according to operational requirements of the GFB 11.

Figure 1F:
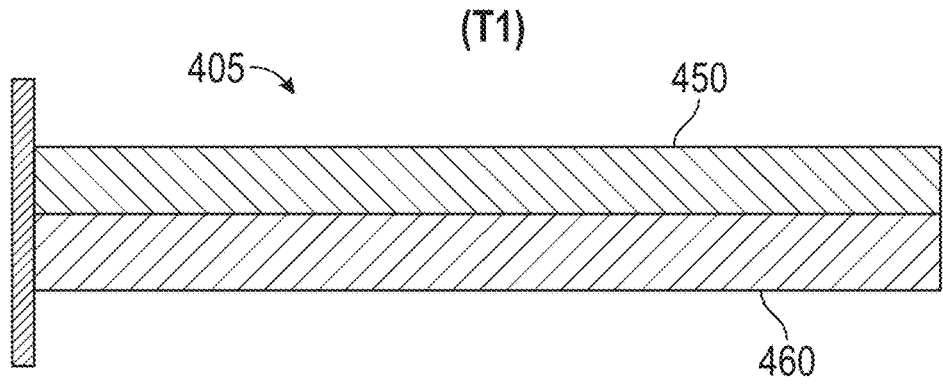
FIG. 1F shows an element that can be utilized for forming the sleeve of the GFB, with a composition gradient formed of a plurality of material layers having different coefficients of thermal expansion (CTE), at a temperature T1.
Figure 1G:
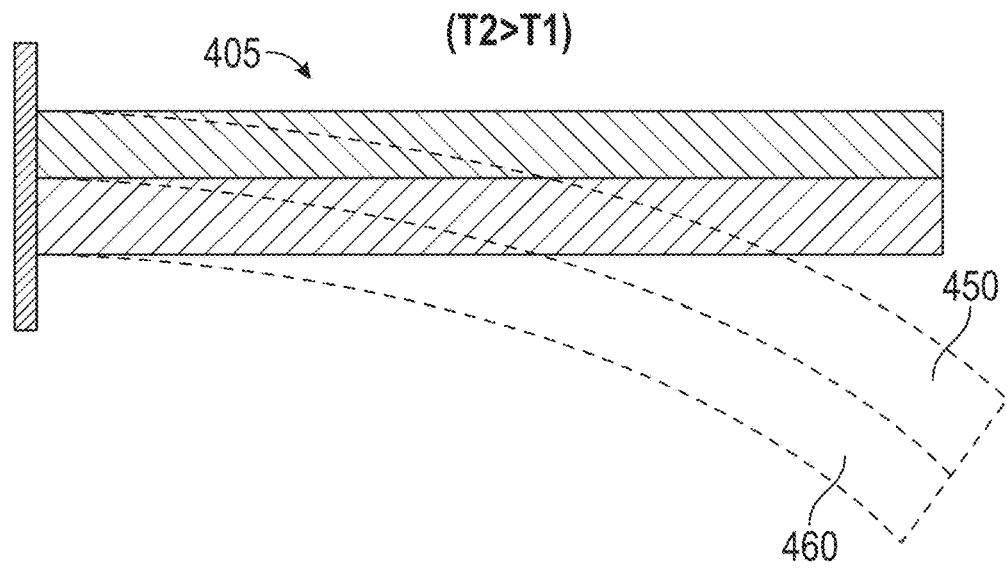
FIG. 1G shows the element of FIG. 1F, at a temperature T2>T1.

As shown in FIG. 1G, with a temperature gradient created across the sleeve 12 using induction heating, the sleeve shape may morph into the required triangulated shape from the circular shape. It is to be appreciated that a thermal gradient may deform a material with uniform composition. For instance, if a surface of the sleeve 12 were to become much hotter at two opposite points on the sleeve 12 (e.g. top and bottom 13A, 13B), the sleeve 12 would take on an oval shape. To obtain an induction induced thermal gradient that produces a desired deformation, the sleeve 12 would have areas 14A-14B (segments extending 120 degrees clockwise and counterclockwise from top center, and another 120 degrees centered on the bottom) spatially defined to absorb electro-magnetic (EM) energy. These areas may be formed with materials capturing electromagnetic energy, such as Ferric fillings and voids filled with fluid/gas.

Figure 1H:
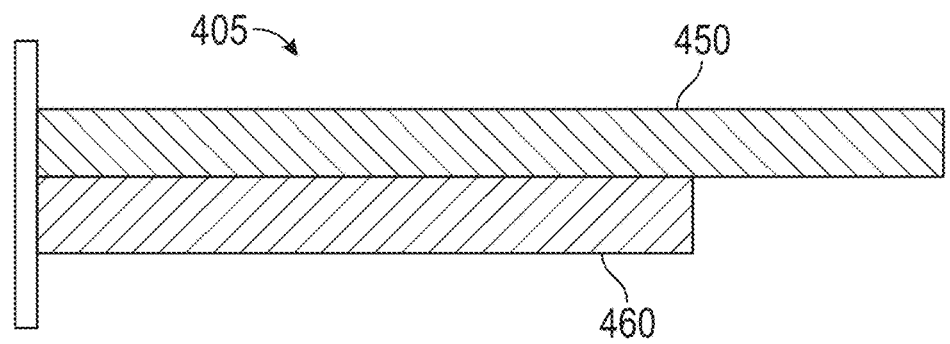
FIG. 1H shows an element similar to that of FIG. 1F at a temperature T2>T1, where a material interface allows free slip between layers, such the layers extend at different rates upon being heated.

FIGS. 1F and 1G show an equivalent structure or linear element 405 to the sleeve 12 discussed above. Specifically, the first and second material layers 450, 360 having different CTEs are at a temperature T1 in FIG. 1F, and T2 that is greater than T1 in FIG. 1G. The controlled thermal expansion shown in FIG. 1G, due to induction heating, results from the material layers being integrally connected. That is, the first and second material layers 450, 460 bend together in a predictable and controlled way. That is, the controlled thermal expansion of the first and second material layers 450, 460 in the disclosed embodiments provides for controlled manipulation of the bearing sleeve 12. FIG. 1H shows an element 405 that is similar to that of FIG. 1F at a temperature T2>T1, where a material interface allows free slip between layers 450, 460, such the layers 450, 460 extend at different rates upon being heated, rather than deforming as shown in FIG. 1G.

Figure 3:
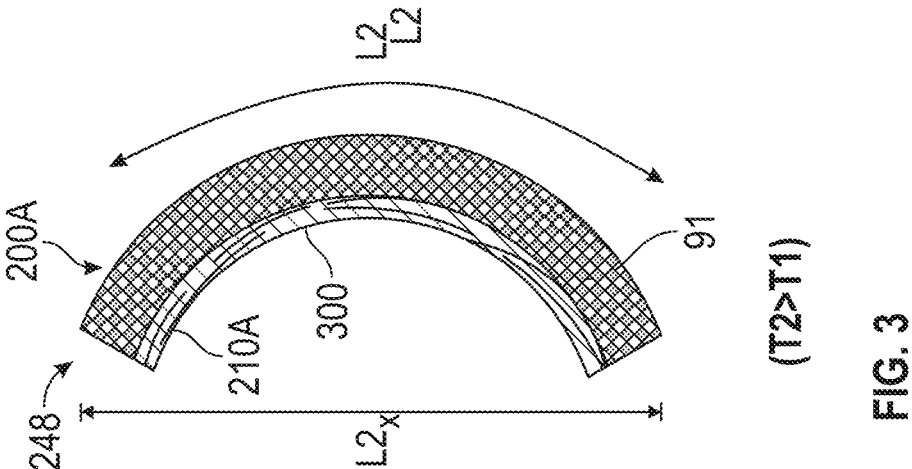
FIG. 3 shows the element of FIG. 2, which has been subject to the selective heating.
Figure 2:
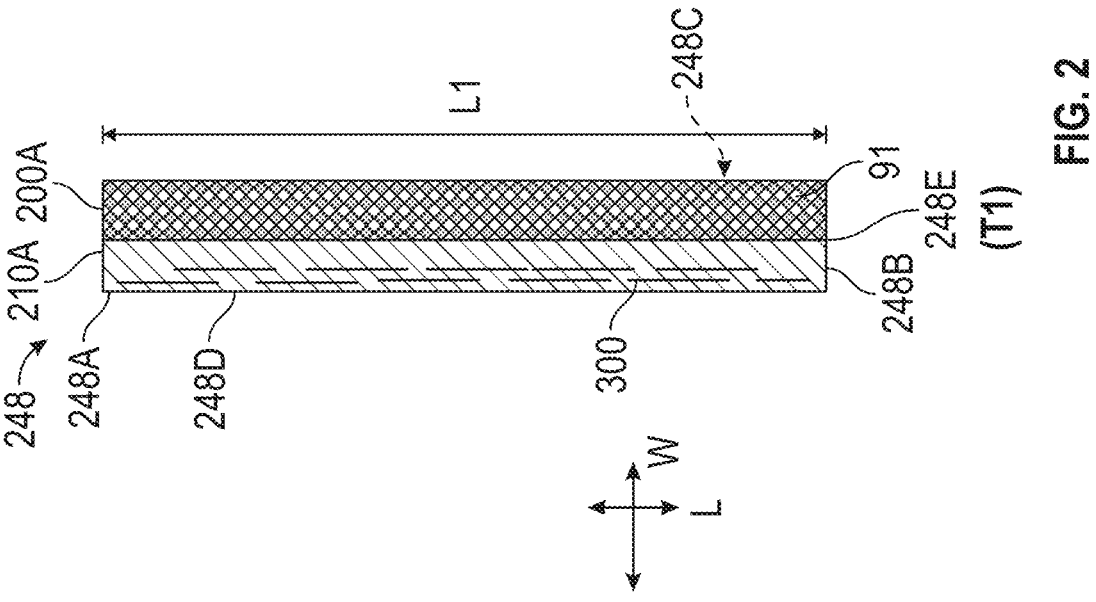
FIG. 2 shows an element that can be utilized in forming the sleeve, having a base formed of a composition gradient defined by two material layers that extend alongside each other, where at least one of the layers includes fluid or gas filled voids that can be selectively heated via induction, and the two material layers have different CTEs selected to provide a predetermined deformation when subjected to the selective heating, and where one of the layers includes fibers.

Turning to FIGS. 2 and 3, an equivalent linear element 248 to the sleeve 12. The element 248 extends in a length direction L from a first end 248A to a second end 248B and a width direction W from a first side 248C to a second side 248D. The element 248 has first and second adjacent layers 200A, 210A that extend lengthwise between the first and second ends 248A, 248B and meet an interface 248E or layer junction.

The element 248 includes first and second adjacent layers 200A and 210A, which have different CTEs. First fibers 300, which are additively reinforcing fibers, are embedded in the one of the first and second adjacent layers 200A, 210A. The fibers 300 may have a CTE which may differ from the CTEs of the adjacent layers 200A, 210A.

Fluid or gas filled voids (or pores) 91 are formed in the element 248. That is, the element 248 represents an additive manufacturing of a material with a closed inner cell inner core or structure, e.g., a lattice with sealed boundaries. Utilizing additive manufacturing allows for the construction of the material with a voided inner core. The voids may be open-cell (interconnected) or closed-cell. In either case, it is possible to control the inside atmosphere. For instance, the element 248 may be additively manufactured in a controlled environment, e.g., a chamber, with the selected gas and pressure with the closed-cell structure. Thus, fluid or gas filled, vacuumed cells provide control of thermal and mechanical properties of the additively manufactured element 248.

Using selective induction heating of the element 248, which can be a composite material with fluid or gas filled voids, the temperature of the element 248 can be increased to control a change in the element shape, e.g., between first and second element shapes. That is, a predetermined shape of the internal material pattern produces a predetermined geometric change due to internal gradients of the CTE.

For example, electromagnetic radiation from induction heating makes dipolar molecules within the voids 91 of the element 248 line-up with the electric field. As the field oscillates the water molecules change direction (at 2.45 GHz). In liquid water, the molecules interact and exchange energy with each other, so the energy of flipping motion is transferred to translational energy of the water molecules i.e., heat, which induces a shape change in the element 248.

Specifically, with increasing temperature, the material volume increases. FIG. 2 shows the element 248 at temperature T1, at a first element shape. FIG. 3 shows the controlled deformation of the element 248 to a second element shape when selectively heated by induction from T1 to T2. As shown, at temperature T1, the element 248 has a length L1 and at temperature T2, the element 248 has a length L2 due to the controlled deformation. With increasing temperature, material volute increases, e.g., due to the expansion of the voids 91. However, as indicated, if the first fibers 300 have a lower CTE, the expansion is restricted. Having this reinforcement non-uniformly distributed may result in the non-uniform expansion and thus curvature or curvature change in shape. Therefore, while an expanded length would otherwise increase to L2 where L2>L1, due to the fibers 300, the length projected on the x axis (vertical) increase only to (L2x<L1). The surface having the larger CTE, e.g., without the fibers 300, would elongate, resulting in a curative increase.

Figure 5:
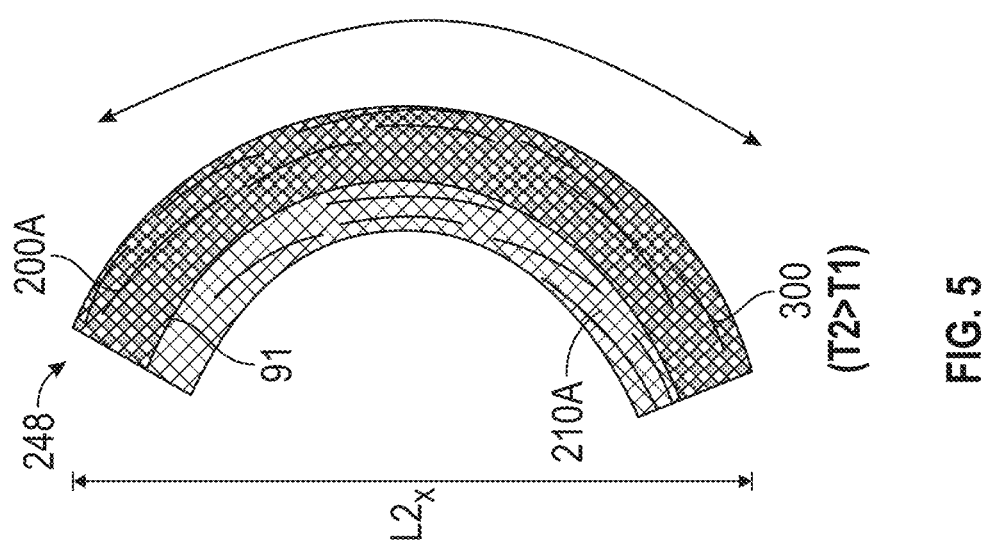
FIG. 5 shows the element of FIG. 4, which has been selectively heated.
Figure 4:
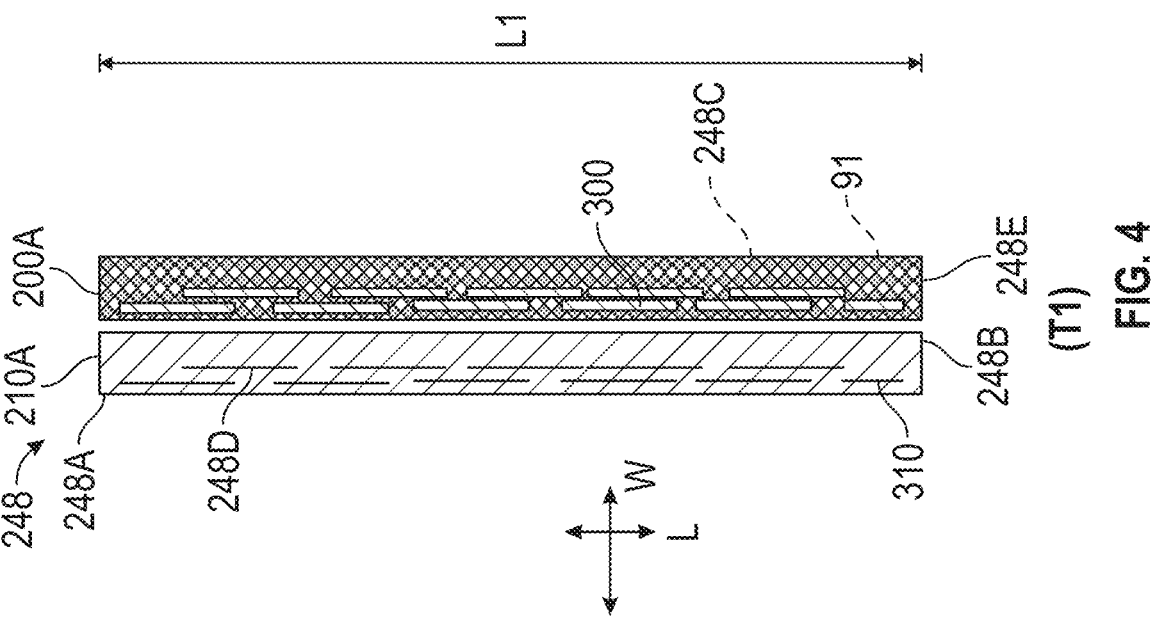
FIG. 4 shows another element that can be utilized in forming the sleeve, having a base formed of a composition gradient defined by two material layers that extend alongside each other, where the layers include fluid or gas filled voids that can be selectively heated via induction, and where the two material layers have different CTEs selected to provide a predetermined deformation when subjected to the heating, and where both of the layers includes fibers having different CTEs.

FIGS. 4 and 5 show another equivalent linear element 248 that can be utilized for the sleeve 12. The element 248 extends in a length direction L from a first end 248A to a second end 248B and a width direction W from a first side 248C to a second side 248D. The element 248 has first and second adjacent layers 200A, 210A that extend lengthwise between the first and second ends 248A, 248B and meet an interface 248E or layer junction.

The first fibers 300 are embedded in the first layer 200A. Second fibers 310, which are also additively reinforcing fibers, are embedded in a second layer 210A. The second fibers 310 may have a CTE which differs from each of the other CTEs in the element 248. In one embodiment, the CTEs of the fibers 300, 310 differ from each other while the other CTEs, e.g., in the layers 200A, 210A, are the same as each other.

Fluid or gas filled voids 91 are formed in the element 248, as with the embodiment shown in FIGS. 2 and 3. When the temperature is selectively increased from T1 to T2 from induction heating, the controlled bend of the element 248 is shown in FIG. 5. As shown, at temperature T1, the element 248 has a length L1 and at temperature T2, the element 248 has a length L2x rather than a more expanded length L2 due to the controlled deformation. In FIGS. 4 and 5, the element 248 has a variable composition with a gradient in the CTE that may be produced with a variation of the type of the fibers 300, 310. That is, the CTE gradient is provided because each of the fibers 300, 310 has a different CTE. The fibers 300, 310 may be straight or twisted and may be metallic, carbon or Kevlar fibers, as non-limiting examples. In one embodiment, the fibers in each of the first and second layers 200A, 210A are different from each other.

Figure 7:
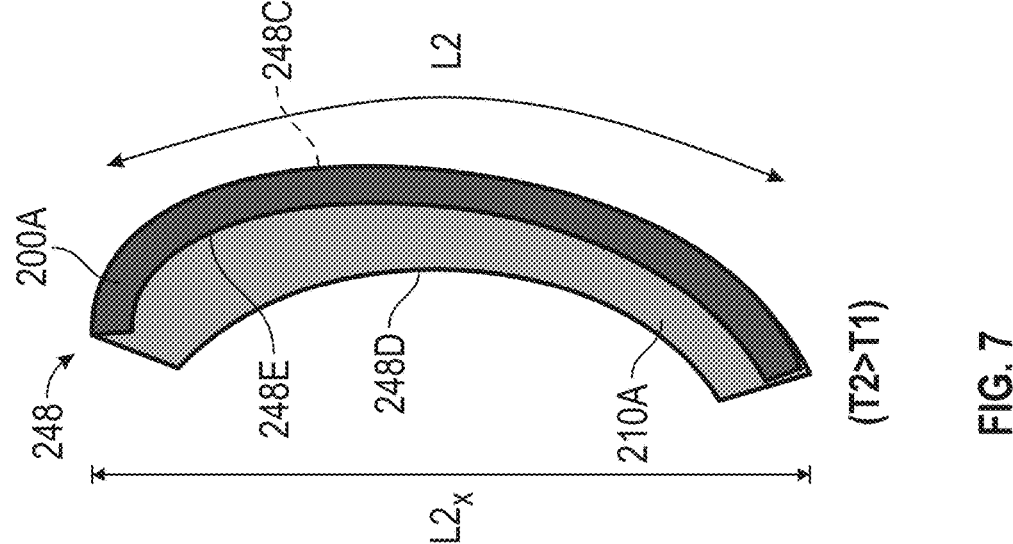
FIG. 7 shows the element of FIG. 6, which has been selectively heated.
Figure 6:
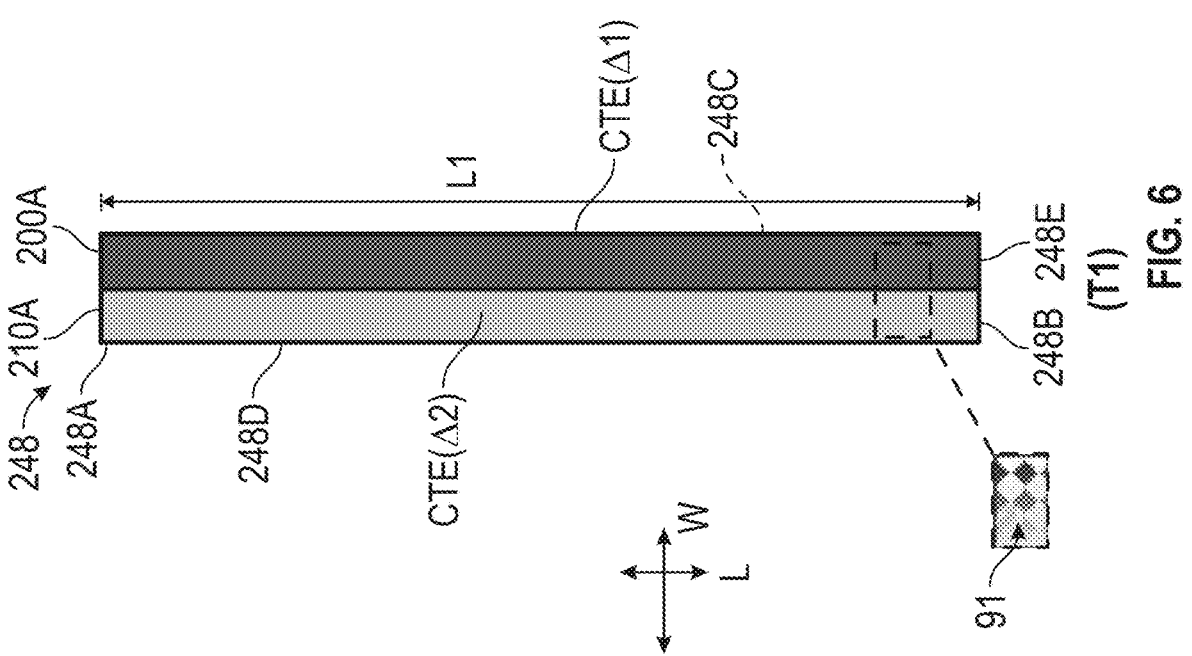
FIG. 6 shows another element that can be utilized in forming the sleeve, having a base formed of a composition gradient defined by two material layers that extend alongside each other, where the layers include voids that can be selectively heated via induction, and with materials have CTE gradients such that the mating surface between two materials has a common CTE, and a maximum difference in the CTEs is at opposite sides of the section.

FIGS. 6 and 7 show another equivalent linear element 248 to the structures discussed above. The element 248 extends in a length direction L from a first end 248A to a second end 248B and a width direction W from a first side 248C to a second side 248D. The element 248 has first and second adjacent layers 200A, 210A that extend lengthwise between the first and second ends 248A, 248B and meet an interface 248E or layer junction.

Figure 14:
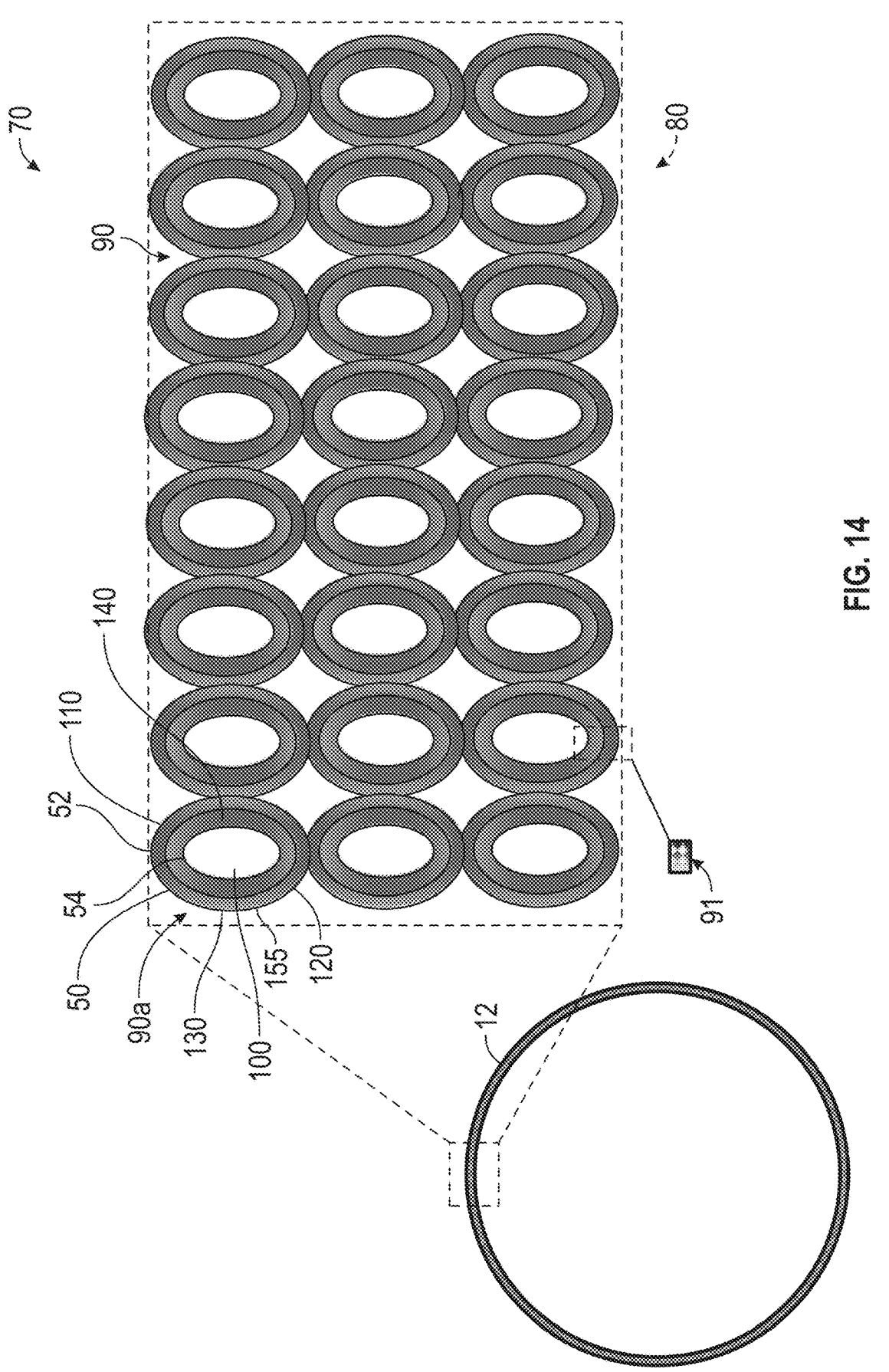
FIG. 14 shows a section of the sleeve, having a base formed of a lattice of beads utilizing composition gradients across the hoop-shaped walls, having inner and outer surfaces, to define perimeter segments along the walls of the beads, where the segments have different coefficients of thermal expansion (CTE) selected to provide a predetermined deformation, and where the beads include fluid or gas filled voids that can be selectively heated via induction.

Fluid or gas filled voids 91 are formed in the element 248, as with the embodiment shown in FIGS. 2 and 3. Both first and second layers 200A, 210A are formed having CTEs that define gradients. The first layer 200A has a first CTE gradient CTE (41) and the second layer 210A has a second CTE gradient CTE (42). The gradients are formed such that they are different from each other at opposite sides 248C, 248D of the element (e.g., inside to outside) but are the same as each other at their interface 248E. When the temperature is increased from T1 to T2 from induction heating, the controlled deformation of the element 248 is shown in FIG. 7. As shown, at temperature T1, the element 248 has a length L1 and at temperature T2, the element 248 has a length L2x rather than the more expanded length L2 due to the controlled deformation. In FIGS. 13 and 14, the variable CTE may be produced by gradually changing the CTE between the adjacent surfaces i.e., during printing, between the outer and inner layers 200A, 210A. In this embodiment, as with each embodiment disclosed herein, the adjacent layers may have different rate of thermal expansion due to the different CTEs.

FIG. 8 shows an oval shaped element 248, which may be formed as indicated above with fluid or gas filled voids 91, in a normal state having a first width W1. FIG. 9 shows the oval shaped element 248 in a deformed state, when subject to induction heating, having a second width W2 that is less than the first width W1. The element 248 does not need to be arcuate in shape. FIG. 10 shows a diamond shaped element 248, which may be formed as indicated above with fluid or gas filled voids 91, in a normal state having a first width W1. FIG. 11 shows the diamond shaped element 248 in a deformed state, when subject to induction heating, having a second width W2 that is less than the first width W1. FIG. 12 shows a random shaped element 248, which may be formed as indicated above with fluid or gas filled voids 91, in a normal state having a first width W1. FIG. 13 shows the random shaped element 248 in a deformed state, when subject to induction heating, having a second width W2 that is less than the first width W1. The desired deformation shape may determine the shape of the element 248.

Turning to FIG. 14, in one embodiment, the bearing sleeve 12 may be additively manufactured with a base 70 formed of a lattice or array (e.g., a plurality) of beads 90, each bead 90a of the beads 90 may be formed as indicated above with fluid or gas filled voids 91. In addition, each of the beads 90 may have a composition gradient defined by hoop-shaped walls 50, each having an outer surface 52, an inner surface 54, to define first through fourth perimeter segments 110, 120, 130, 140 (generally segments 155) along the walls of the bead 90. The segments 155 may have different coefficients of thermal expansion (CTE) (equivalent to the primary and secondary materials identified in FIG. 3) selected to provide a predetermined deformation, e.g., to expand or contract the beads 90 and thereby expand or contract the sleeve.

The composition gradient may be formed of a first material having a first coefficient of thermal expansion (CTE) and a second material having a second CTE that differs from the first CTE. The composition gradient may be formed by the utilization of different metals, such as bistable metals, or may be formed by thermoplastic polymer plastic, fillings or fibers, which may be straight or twisted. The fluid or gas filled voids 91 may be in either or both of the material layers. The base 70 may define an outer boundary 80 and the lattice of beads 90 within the boundary 80. The beads 90 may have an oval cross section, though such shape is not intended on limiting the scope of the embodiments.

Each of the beads 90 may have a center bead void 100 or cavity or pore and may include the first and second perimeter segments 110, 120 that are opposite each other. The beads 90 may include the third and fourth perimeter segments 130, 140 that are opposite each other, adjacent to the first and second perimeter segments 110, 120. With this configuration, each of the beads 90 forms a circumferential (or perimeter) CTE gradient.

Adjacent ones of the beads 90 may be interconnected with each other, e.g., along the perimeter segments 110-140. With this interconnected configuration, the beads 90 form the lattice.

Changing a shape of the beads 90, e.g., by induction heating of the fluid or gas filled voids 91, influences convection inside of beads 90. Changing a shape also changes gas pressure inside of the beads 90 if the beads are formed as closed pores. Adjacent bead walls may become in contact or out of contact with each other, resulting in different dominant modes of heat transfer. Variable bead geometries may produce different thermal radiation rates, e.g., radiation may be intentionally scattered in different directions as compared with being one dimensional.

Figures 15, 16:
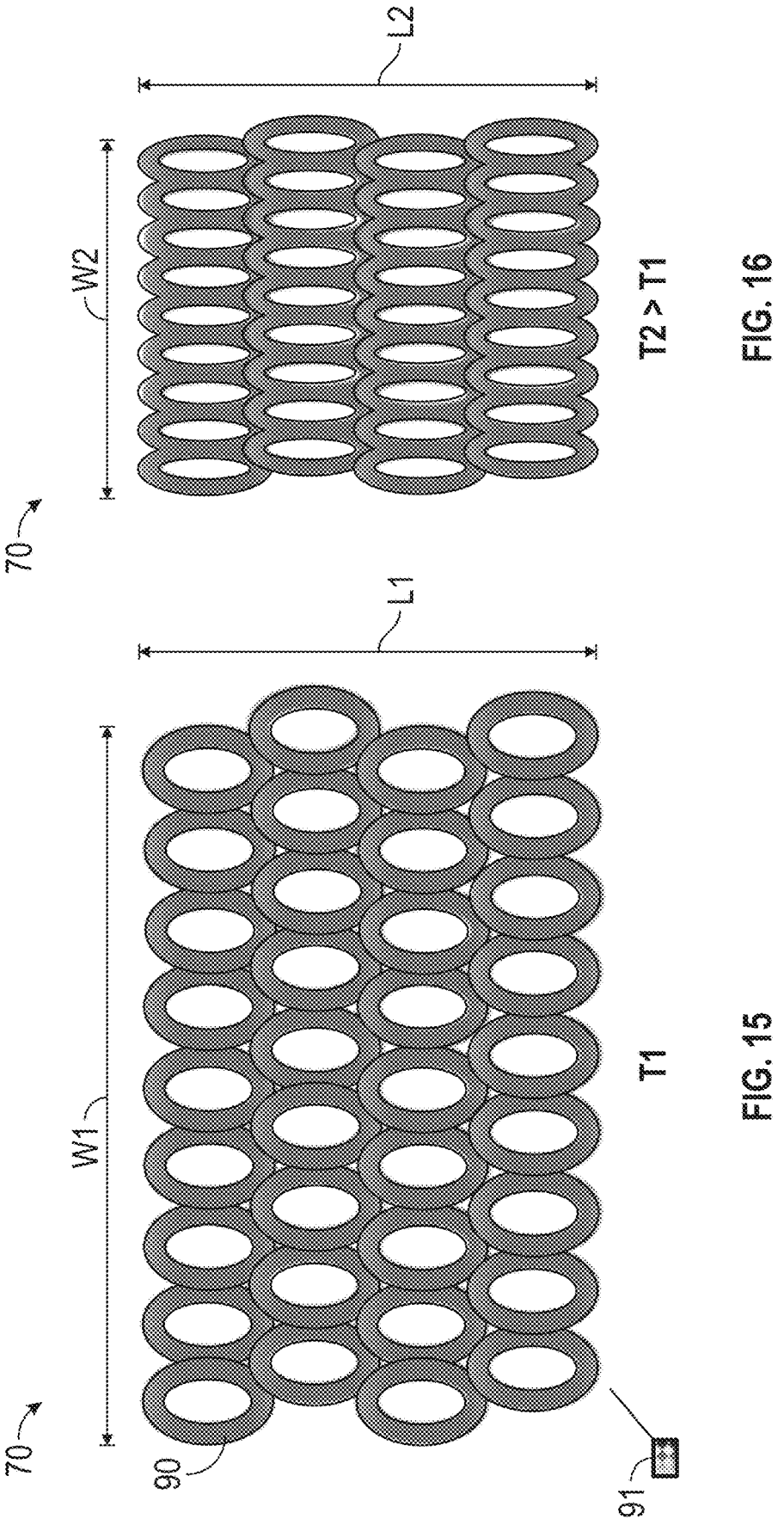
FIG. 15 shows the lattice of beads in a normal state.
FIG. 16 shows the lattice of beads in a deformed state from being selectively heated.

The beads 90 may be formed of a plastic and more specifically a fibrous plastic. The beads 90 may be configured to change shape by a predetermined amount when subject to heating or cooling, e.g., heat, due to the second CTE obtained with the composition gradient. For example, when the fluid or gas filled voids 91 are subject to induction heating, the beads 90 as a whole heat up and a shape of the base 70 may change from a first state (FIG. 15) to a second state (FIG. 16), or vice versa as the beads 90 cool. In the first state, the base 70 may extend in a first direction (or length direction) to define a first length L1 and in a second direction (or width direction) to define a first width W1. In the second state the base 70 may extend in the first direction to define a second length L2 and in the second direction to define a second width W2. From the shape change, one of the first length and width L1, W1 may be greater or smaller than a corresponding one of the second length and width L2, W2. As shown in FIGS. 15 and 16, the first width W1 is greater than the second width W2 and the first and second lengths L1, L2 are the same as each other.

Figure 18:
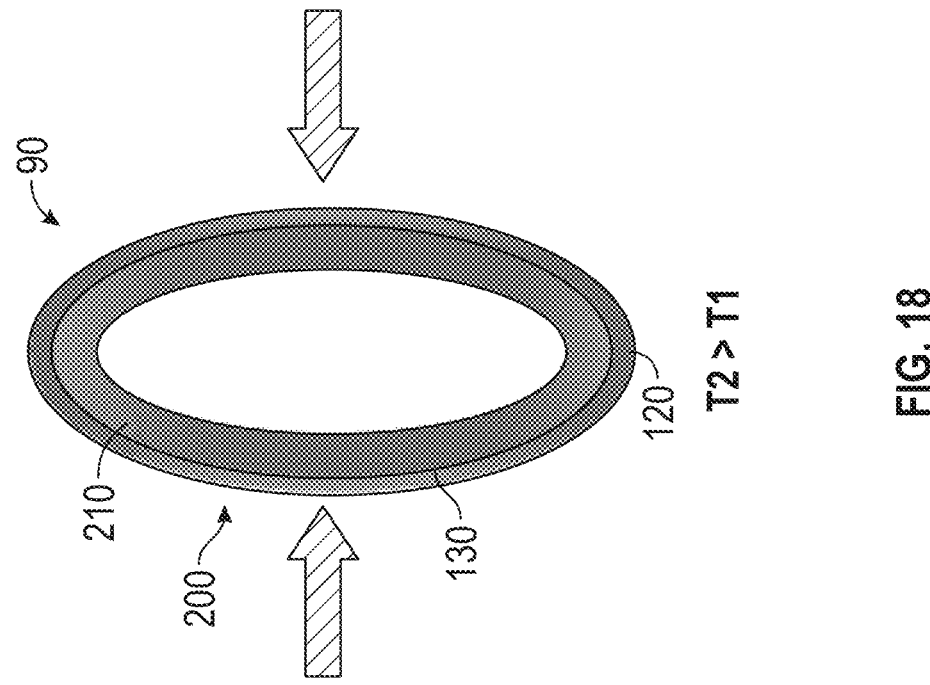
FIG. 18 shows the bead of FIG. 17 in a deformed state from being selectively heated.
Figure 17:
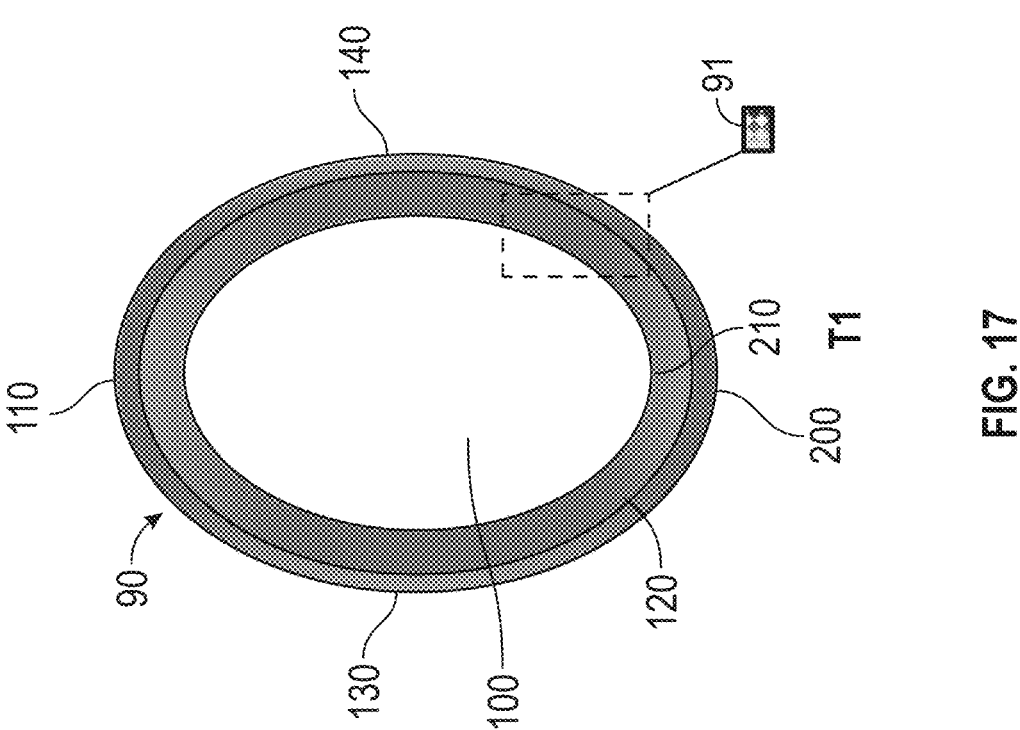
FIG. 17 shows an embodiment of a bead, where the bead is in a normal state.

As shown in FIGS. 17 and 18, in one embodiment, each perimeter segment 110-140 may have a radial inner surface (or layer or portion) 210 and a radial outer surface (or layer or portion) 200. It is to be appreciated that the use of the term radial in this context does not require a circular cross section but rather references a distance from a center of the bead 90. The inner surface 210 of the first and second perimeter segments 110, 120 may be formed to have a first CTE and the outer surface 200 of the first and second perimeter segments 110, 120 may be formed to have a second CTE. As indicated, this may be obtained from different materials, such as different fibers in a base of plastic (e.g., first and second materials corresponding to first and second fibers). The inner surface 210 of the third and fourth perimeter segments 130, 140 may be formed to have the second CTE and the outer surface 200 of the third and fourth perimeter segments 130, 140 may be formed to have the first CTE. Any or all of the segments may be formed with fluid or gas filled voids 91.

FIG. 17 shows the bead 90 in a first state when the bead 90 is not subject to inductive heating, and FIG. 18 shows the bead in a second state, when the bead 90 is subject to inductive heating. The embodiment shown in FIGS. 17 and 18 provides a radial CTE gradient that results in a tailored deformation of the beads 90 upon being subject to different amounts of thermal input.

Figure 19:
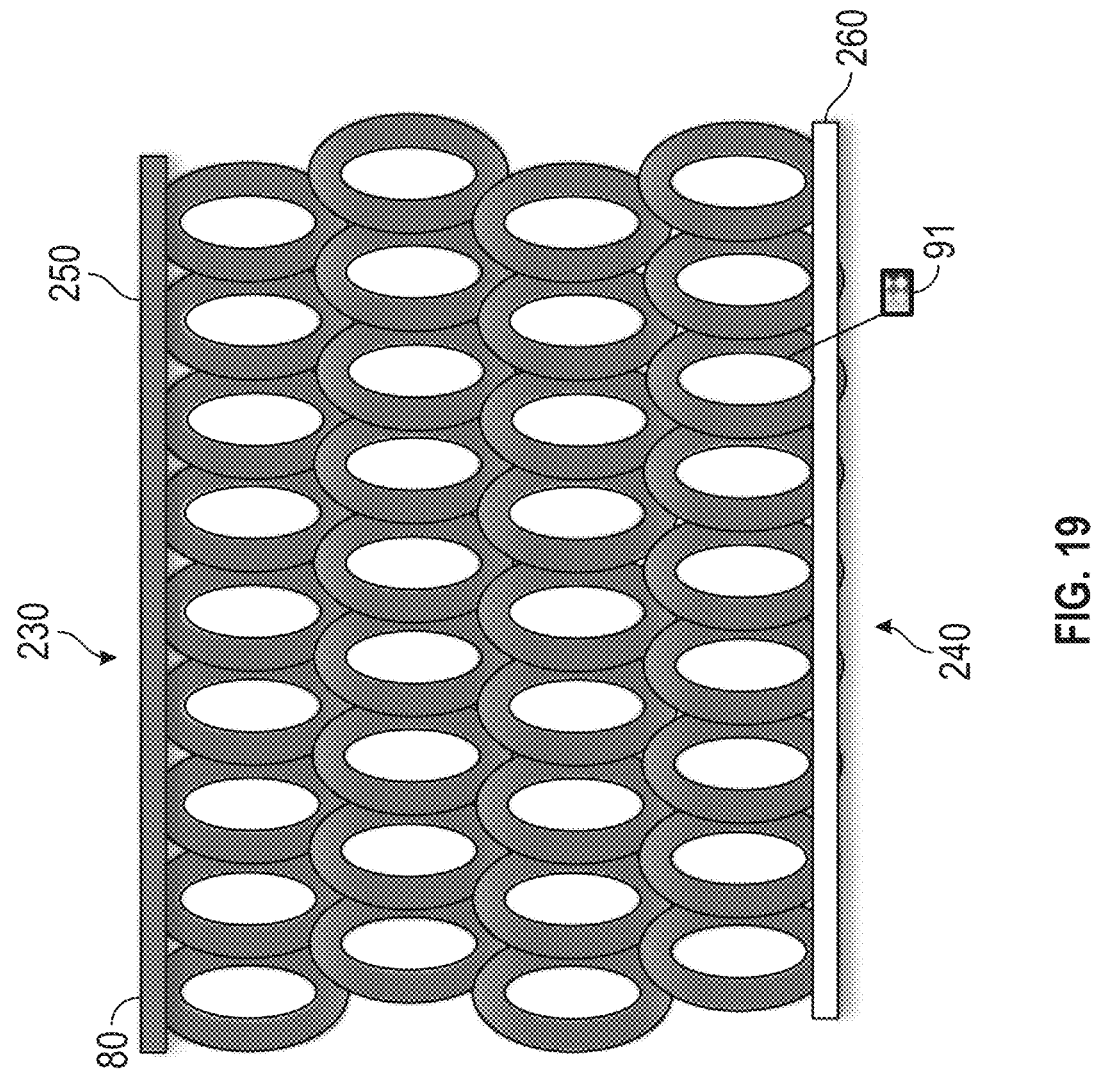
FIG. 19 shows the lattice of the beads with top and bottom elastomer layers.

As shown in FIG. 19, the outer boundary 80 defines a first (or top) outer end 230 and a second (or bottom) outer end 240. The first and second outer ends 230, 240 are opposite each other. In one embodiment, a top elastomer layer 250 is disposed against the first end 230 of the outer boundary 80 and a bottom elastomer layer 260 is disposed against the second outer end 240 of the outer boundary 80.

Figure 21:
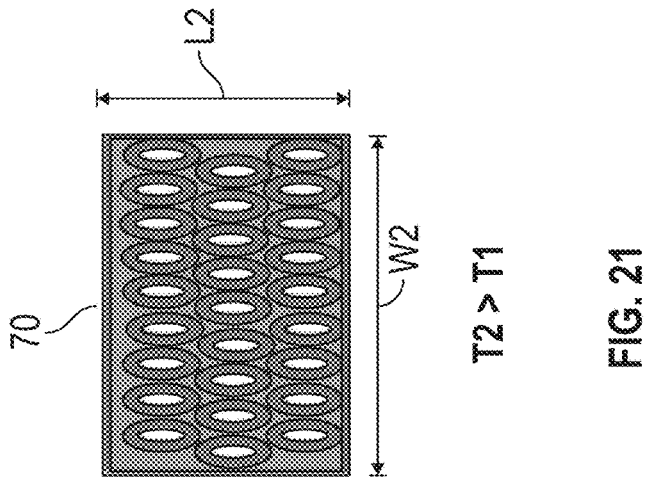
FIG. 21 shows the section of FIG. 20 in a deformed state from being selectively heated.
Figure 20:
FIG. 20 shows an alternate configuration of the section of the sleeve, having a base that defines voids, where ones of the voids are lined with the beads, and where the beads include fluid or gas filled voids that can be selectively heated via induction.

Turning to FIGS. 20 and 21, in one embodiment, the bearing sleeve having a diameter D is shown, and the base 70 of the bearing sleeve 12 may be manufactured with a support structure 280 that may define the outer boundary 80 of the base 70 and a plurality of base voids 290, which are internal voids or cavities. Each of the base voids 290 may be lined with one of above disclosed beads 90 and thus have a cavity surface 295 defining a cross sectional shape that is complementary to the shape of the beads 90. The support structure 280 may be formed of a support material that differs from the bead material. An exterior surface 85, surrounding the outer boundary 80 of the base 70, maybe be coated with the materials that form the bead 90. The support material may be an elastomer, a metal, an alloy or a composite, as can be the beads 90. The beads 90 and/or the support structure 280 may be formed with fluid or gas filled voids 91 so that selective inductive heating of the voids 91 results in heating the beads 90 to provide the desired shape change.

FIGS. 20 and 21 show the base 70 in the first state, having a first length and width L1, W1, and the second state, having a second length and width L2, W2. As indicated above, from the shape change, one of the first length and width L1, W1 may be greater or smaller than a corresponding one of the second length and width L2, W2. In the illustrated embodiment, the second width W2 is smaller than the first width W1 and the first and second lengths L1, L2 are the same as each other. As indicated, the smaller state may be a result of selective inductive heating and the larger state may be the result of cooling, depending on design parameters of the materials and their coefficients of thermal expansion.

The above embodiments have applications beyond parts of a GFB. For example, the embodiment can be applied to pipes, channels, vane diffusers, shrouds, structures defining shroud bleed ports, housings, seals, rotors, airfoils/inlet and outlet guide vanes, dampers, lovers, flow strainers, micro-pumps, micro actuators, dampers with controlled stiffness, flow control devices such as valves, expansion nozzles, throttles, adaptive air structures such as drone wings, flaps, etc., locking devices, pipe connections, adaptive airfoils, fan blades, wings, etc. If the sleeve shape is triangulated when cold and circular when heated, issues may arise when attempting to restart the machine. The sleeve may still be circular due to remaining warm from the prior usage, though the triangulated shape is desired. However, with the embodiments, when a machine needs to be restarted, the sleeve shape remains triangulated shape, which enables a desired start dynamic that is equivalent to a cold-start dynamic between the sleeve and the shaft within the sleeve.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A component of a gas foil bearing, comprising:
   a plurality of materials forming a composition gradient that defines a first coefficient of thermal expansion (CTE) and a second CTE that differs from the first CTE,
   wherein:
      the plurality of materials include one or more of different metals, plastics, or fibers; and
      the plurality of materials is formed with fluid or gas filled voids, so that when the component is subject to selected heating, the fluid or gas filled voids increase in temperature and the component changes from a first shape to a second shape.
2. The component of claim 1, wherein the component is a bearing sleeve.

3. The component of claim 2, wherein
the first shape is a curved triangulated shape, and the
second shape is circular.

4. The component of claim 1, comprising:
a structural element that defines an outer boundary and
extends in a first direction between first and second
ends to define a length of the element and in a second
direction to define a width of the element,
wherein:
    a first layer extends in the first direction between the
first and second ends and has a first CTE; and
    a second layer extends in the first direction between the
first and second ends and has the second CTE that
differs from the first CTE, wherein a layer junction
is defined between the first and second layers,
    wherein the element is configured to define a first
element shape when the element is a first tempera-
ture and a second element shape when the element is
at a second temperature that is greater than the first
temperature.

5. The component of claim 4, including one or more of:
first fibers in the first layer that have the first CTE; and
second fibers in the second layer that have the second
CTE.

6. The component of claim 4, wherein
the first shape is linear, and the second shape is arcuate.

7. The component of claim 4, wherein
one or both of the first and second layers are formed of
first and second materials, one or both of which is a
bistable metal, alloy or composite.

8. The component of claim 7, wherein
the composition gradient is formed of a first material
having the first CTE and a second material having the
second CTE.

9. The component of claim 1, comprising:
a base formed by the composition gradient defining the
first CTE and the second CTE that differs from the first
CTE,
wherein:
    the base defines an outer boundary and beads within the
outer boundary; and each of the beads has a bead void, and each of the beads
    includes:
    first and second perimeter segments that are opposite
        each other and formed to define the first CTE; and
    third and fourth perimeter segments that are opposite
        each other, adjacent to the first and second perimeter
        segments, and formed to define the second CTE.

10. The component of claim 9, wherein:
each perimeter segment has a radial inner surface and a
    radial outer surface;
the radial inner surface of the first and second perimeter
    segments is formed to define the first CTE and the
    radial outer surface of the first and second perimeter
    segments is formed to define the second CTE; and
the radial inner surface of the third and fourth perimeter
    segments is formed to define the second CTE and the
    radial outer surface of the third and fourth perimeter
    segments is formed to define of the first CTE.

11. The component of claim 9, wherein
adjacent ones of the beads are interconnected to form a
    lattice.

12. The component of claim 9, wherein:
the outer boundary defines a first outer end and a second
    outer end, wherein the first and second outer ends are
    opposite each other, and
the base includes a top elastomer layer that is disposed
    against the first outer end of the outer boundary and a
    bottom elastomer layer that is disposed against the
    second outer end of the outer boundary.

13. The component of claim 9, wherein
the base includes a support material that forms a support
    structure that defines the outer boundary of the base and
    a plurality of base voids, wherein each of the plurality
    of base voids is lined with one of the beads.

14. The component of claim 13, wherein
the support material is different from the beads.

15. The component of claim 9, wherein
the beads are oval shaped.

16. The component of claim 9, wherein
the beads are diamond shaped.

* * * * *